United States Patent [19]

Fletcher et al.

[11] 3,816,657

[45] June 11, 1974

[54] DIFFERENTIAL PHASE-SHIFT-KEYED COMMUNICATION SYSTEM

[76] Inventors: James C. Fletcher, Administrator of the National Aeronautics and Space Administration with respect to an invention of; Philip M. Hopkins, 818 Wavecrest Ln., Houston, Tex. 77058; Wally M. Wallingford, 89 Bayou Ln. Rt. 1, Kemah, Tex. 77565

[22] Filed: Oct. 12, 1972

[21] Appl. No.: 297,128

[52] U.S. Cl. .................................... 178/67, 325/30

[51] Int. Cl. ............................................ H04l 27/24

[58] Field of Search .......... 178/67, 88; 325/30, 163, 325/320

[56] References Cited

UNITED STATES PATENTS

| | | | |
|---|---|---|---|
| 3,524,023 | 11/1970 | Whang | 178/67 |
| 3,619,503 | 11/1971 | Gagsdale | 178/67 |
| 3,643,023 | 2/1972 | Ragsdale | 325/320 |

*Primary Examiner*—Albert J. Mayer

*Attorney, Agent, or Firm*—Marvin J. Marnock; John R. Manning; Marvin F. Matthews

[57] ABSTRACT

A communication system using differential phase-shift-keying (DPSK) transmits and receives binary data without requiring timing or phase reference signals. The system encodes and modulates the data at the transmitter, and decodes and demodulates the data at the receiver, without ambiguity as to the data content.

7 Claims, 5 Drawing Figures

PATENTED JUN 11 1974 3,816,657

SHEET 2 OF 3

DIFFERENTIAL PHASE-SHIFT-KEYED COMMUNICATION SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

1. Field of the Invention

The present invention relates to differential phase-shift-keyed (DPSK) communication systems.

2. Description of the Prior Art

Prior art quadriphase phase shift keying communication systems required a phase reference signal in encoding and decoding to determine the amount of phase shift to correctly indicate the data.

When the phase reference signal was transmitted with the data, the signal-to-noise ratio of the data in the signal was reduced, and bandwidth available for data was consumed. When the phase reference signal was generated at the receiver, such signal assumed any one of four phases relative to the received data, causing ambiguity as to the data content. Reference signals derived from the incoming data were dependent in accuracy on the state of the transmission medium.

SUMMARY OF INVENTION

Briefly, the present invention provides a new and improved differential phase-shift-keyed communication system and transmitter for phase-shift-keyed signals formed from input data bits.

A carrier source at the transmitter provides a carrier signal of a predetermined frequency, and an encoder responds to the input data bits forming phase increment signals in accordance with the input data bits. The phase increment signal is modulated onto the carrier and sent from the transmitter to the receiver.

The encoder compares the incoming data bits for each successive transmission interval with the phase increment signal for the preceding transmission interval to form the next phase increment signal. The encoder includes a storage circuit for the phase increment signal and digital circuitry for performing the comparing and encoding.

It is an object of the present invention to provide a new and improved different phase-shift-keyed communication system and transmitter.

DESCRIPTION OF PREFERRED EMBODIMENT

Figure 1:
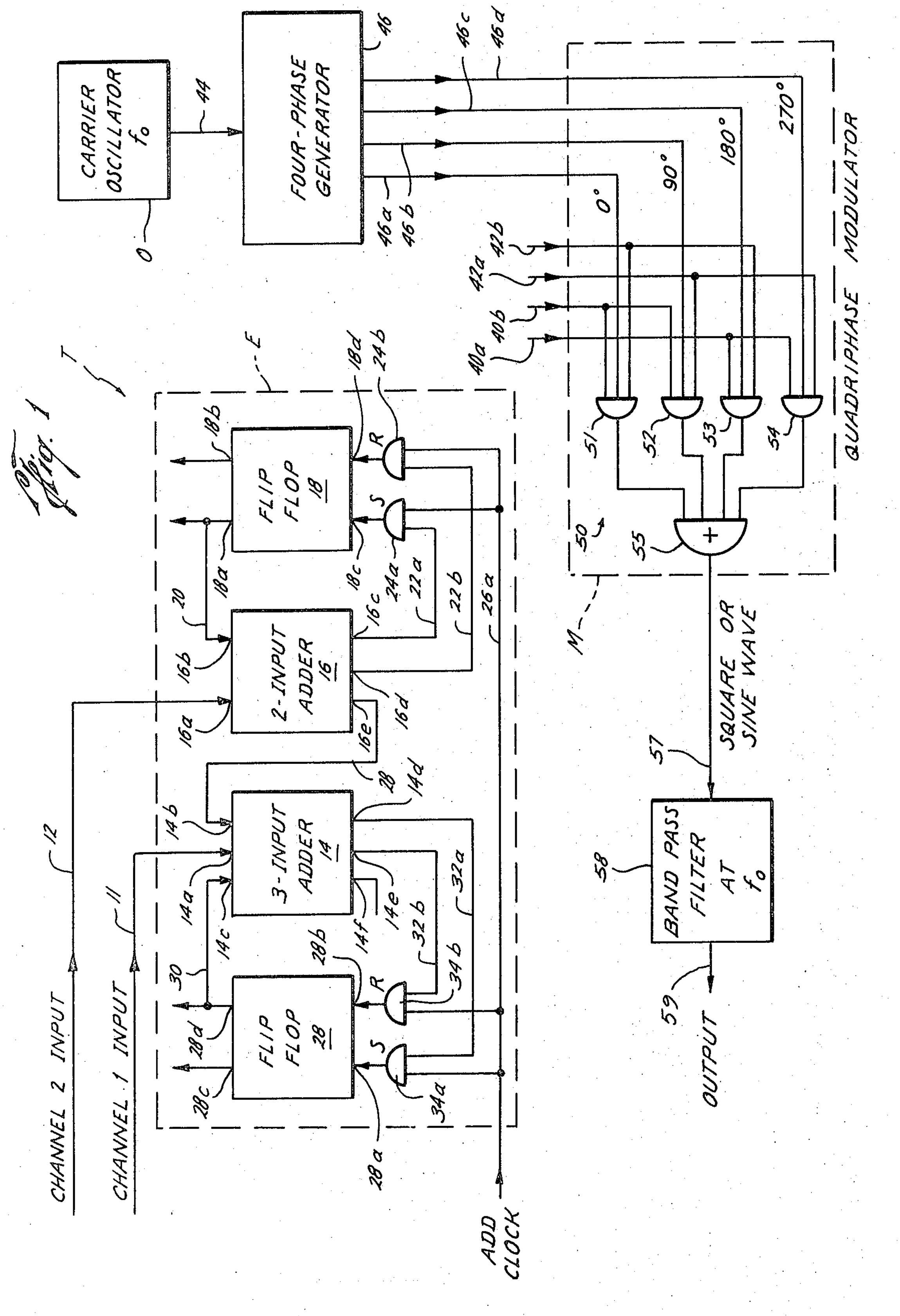
FIG. 1 is a schematic electrical circuit diagram of the transmitter of the present invention.
Figure 2:
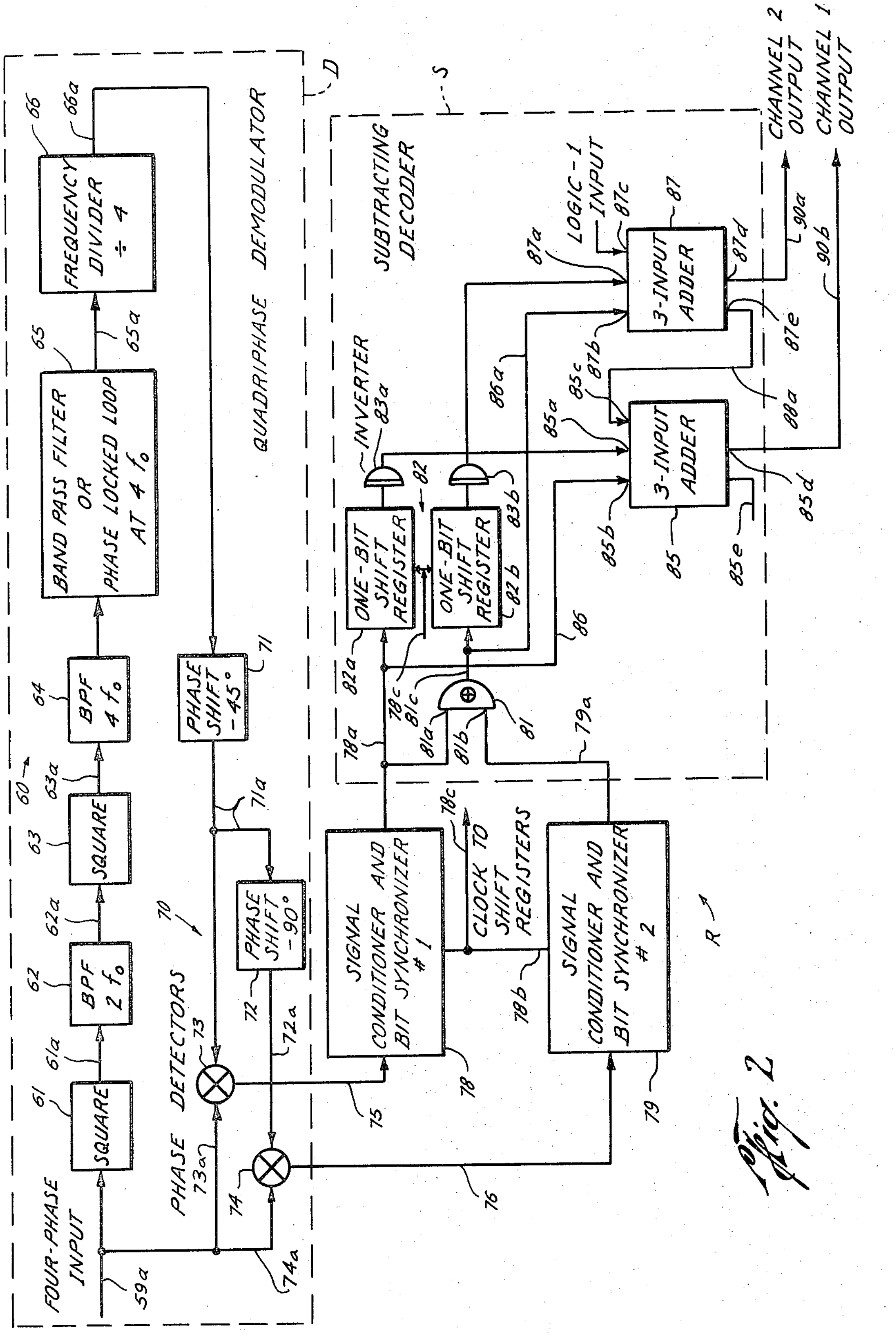
FIG. 2 is a schematic electrical circuit diagram of a receiver of the system of the present invention.

In the drawings, a communication system for transmitting differential phase-shift-keyed signals (DPSK) formed from input data bits is shown. The system includes a transmitter T (FIG. 1) which sends the phase-shift-keyed signals over a telehone or a telegraph wire or on a subcarrier in an RF communication system, or in other data communication systems to a receiver R (FIG. 2).

The transmitter T includes a carrier source oscillator O which provides a carrier signal of a predetermined frequency to a modulator M. An encoder E responds to incoming input data bits and forms a phase increment signal which is modulated onto the carrier signal by the modulator M.

The encoder E of the transmitter T receives on input conductors 11 and 12 the incoming or input data bits to be transmitted by the transmitter T. For identification purposes, the data bits on the input conductor 11 are labeled "Channel 1," while the data bits on the input conductor 12 are labeled "Channel 2."

Figure 3:
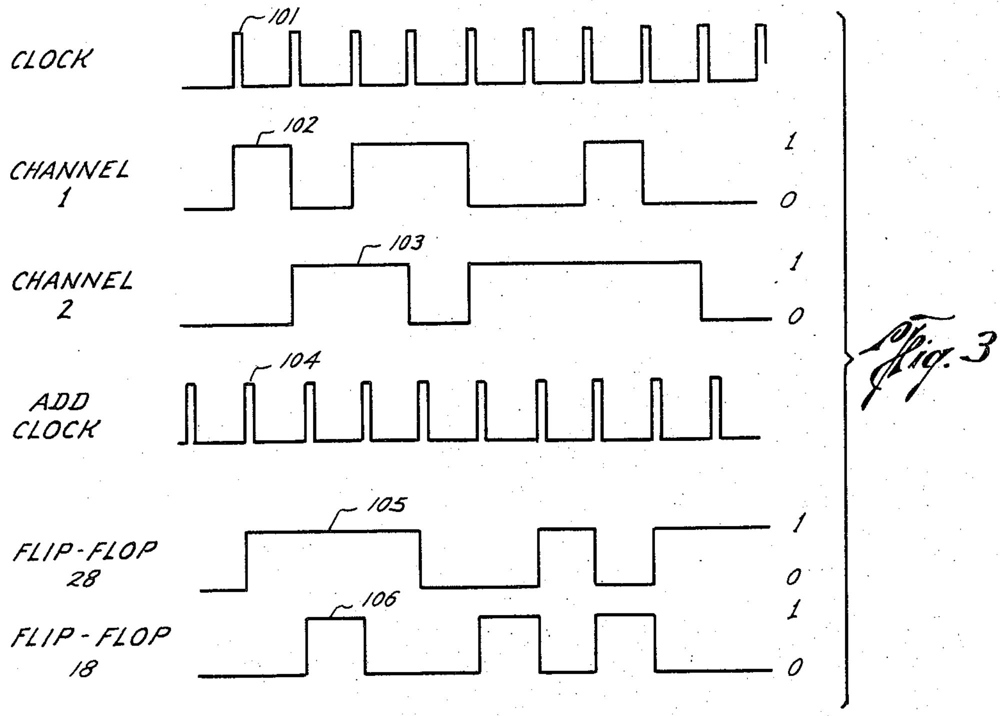
FIG. 3 is a voltage waveform diagram of signals present in the transmitter of FIG. 1.

The input bits are synchronized by a bit clock producing a "Clock" pulse waveform 101 (FIG. 3). The input bits of Channel 1 and Channel 2 are in conventional digital data format as indicated by voltage waveforms 102 and 103 (FIG. 3), respectively. The bits of Channel 1 and Channel 2 may be from two separate channels of data, or may be two serial bits from a single data bit stream converted to parallel format in a conventional serial-to-parallel data format converter.

The encoder E further receives an Add Clock signal, of like frequency to the clock pulse waveform 101. As indicated at 104, the Add Clock pulse waveform is slightly delayed from the clock pulse waveform in order to allow the encoder E to respond to changes in the incoming data on Channel 1 and Channel 2 before encoding same.

The input conductor 11 furnishes the Channel 1 data to a first input terminal 14*a* of a three-input digital adder 14. The input conductor 12 furnishes the Channel 2 data to a first input terminal 16*a* of a two-input adder 16. The incoming data on the conductors 11 and 12 to the encoder E accordingly is in the form of pairs of data bits.

The encoder E receives the incoming pairs of data bits and forms, in a manner to be set forth below, a phase increment signal composed of two bits. These two bits, based on the incoming data, are furnished to the modulator M to indicate the desired output signal. The two-input adder 16 forms a first bit of the phase increment signal, while the three-input adder 14 forms the second bit of such signal. Accordingly, the incoming data bit pairs of Channel 1 and Channel 2 are designated the second incoming data bit and the first incoming data bit, respectively, in accordance with the designation of the bits of the phase increment signal formed in the adders 14 and 16.

The two-input adder 16 is a conventional digital logic circuit and forms the first bit of the phase increment signal by comparing an incoming data bit present at the input terminal 16*a* with the first bit of the phase increment signal formed during the preceding transmission interval. The first bit of the phase increment signal formed during the preceding transmission interval is stored in a first storage flip-flop 18. The flip-flop 18 may be any suitable bistable digital logic memory device.

A first output terminal 18*a* of the flip-flop 18 provides a logic "1" signal when the first bit of the phase increment signal during the preceding transmission interval was a logic "1" signal. A conductor 20 electrically connects the output terminal 18*a* to a second input terminal 16*b* of the two-input adder 16. A second output terminal 18*b* of the flip-flop 18 provides a logic "1" level signal when the first bit of the phase increment signal formed during the preceding transmission interval was a logic "0."

The two-input adder 16 serves as a first adder in the encoder E and forms the first bit of the phase increment signal. The adder 16 forms a logic "1" output signal and provides same at a first output terminal 16*c* when the stored first bit present at the input terminal 16*b* and the incoming data bit present at the input terminal 16*a* differ from each other. The output signal present at the terminal 16*c* is furnished by a conductor 22*a* to an input AND gate 24*a*. The input gate 24*a* further receives the Add Clock pulse waveform 104 over an input conductor 26*a*. The AND gate 24*a* furnishes the signal from the output terminal 16*c* of the adder 16 to an S input 18*c* of the flip-flop 18.

The adder 16 forms a logic "1" output signal at an output terminal 16*d* thereof when the stored first bit present at the input terminal 16*b* and the incoming data bit at the input terminal 16*a* are the same logic level. The signal present at the output terminal 16*d* is furnished by a conductor 22*b* to a second input AND gate 24*b*. The AND gate 24*b* further receives the Add Clock pulse waveform 104 to furnish the signal from the output terminal 16*d* to an R input terminal 18*d* of the flip-flop 18.

The flip-flop 18 stores the first bit of the phase increment signal formed by the adder 16 for the duration of one transmission interval, or the time between successive pulses in the Add Clock waveform 104. The signal furnished to the S input terminal 18*c* is stored in the flip-flop 18 and provided at the output terminal 18*a*, while the signal furnished to the R input terminal 18*d* of the flip-flop 18 is stored therein and provided at the output terminal 18*b*.

The adder 16 forms a carry output signal when the stored first bit present at the input terminal 16*b* and the incoming data bit present at the input terminal 16*a* are each at a logic "1" level. The carry output signal is provided at an output terminal 16*e* and furnished by a conductor 28 to a second input terminal 14*b* of the three-input adder 14.

The three-input adder 14 is a conventional digital logic circuit and forms the second bit of the phase increment signal by comparing a second incoming data bit present at the input terminal 14*a* with the second bit of the phase increment signal formed during the preceding transmission interval. Adder 14 receives the stored second bit from a storage flip-flop 28 at an input terminal 14*c* over a conductor 30.

The three-input adder 14 thus functions as a second adder and digitally adds the stored second bit provided at the input terminal 14*c*, the second incoming data bit provided at the input terminal 14*a* and the carry output signal from the adder 16 furnished at the input terminal 14*b* to form the second bit of the phase increment signal.

The three-input adder 14 provides a logic "1" output signal at an output terminal 14*d* thereof when the digital sum of the three input signals is a logic "1," with or without carry. The three-input adder 14 provides a logic "1" output signal at an output terminal 14*e* thereof when the digital sum of the three input signals is a logic "0," with or without carry.

The adder 14 provides a Carry signal at a carry output 14*f* thereof when at least two of the three input signals are logic "1." The carry output terminal 14*f* is not used, since as will be set forth below, only four phase increments are needed from the encoder E.

The output terminal 14*d* of the adder 14 is connected through a conductor 32*a* to an input AND gate 34*a*. The AND gate 34*a* receives the Add Clock waveform 104 from the conductor 26*a* and transfers the output signal from the output terminal 14*d* to an S input 28*a* of the flip-flop 28.

The output terminal 14*e* of the adder 14 is connected by a conductor 32*b* to an input AND gate 34*b*. The AND gate 34*b* receives the Add Clock pulse waveform 104 from the conductor 26*a* and gates the signal from the output terminal 14*e* of the adder 14 to an R input terminal 28*b* of the flip-flop 28.

The flip-flop 28 is a conventional binary storage device and stores therein the second bit of the phase increment signal, formed by the adder 14. An output terminal 28*c* of the flip-flop 28 provides the signal level present at the S input 28*a* thereof when the AND gate 34*a* is energized by the Add Clock pulse waveform 104. An output terminal 28*d* of the flip-flop 28 presents the signal level present at the R input 28*b* when the AND gate 34*b* is energized by the waveform 104.

The encoder E accordingly forms the phase increment signal of two bits from the incoming data bits of Channel 1 and Channel 2 present on the conductor 11 and 12. Bit 2 is formed in the three-input adder 14 and stored in the flip-flop 28. Conductors 40*a* and 40*b* electrically connect the outputs 28*c* and 28*d* of the flip-flop 28, respectively, to the modulator M. Bit 1 of the phase increment signal is formed by the two-input adder 16 and stored in the flip-flop 18. Conductors 42*a* and 42*b* electrically connect the output terminals 18*a* and 18*b*, respectively, to the modulator M. Portions of the conductors 40*a*, 40*b*, 42*a* and 42*b* are not shown in the drawings in order to preserve clarity therein.

The carrier source oscillator O is a conventional oscillator providing an output signal at a predetermined carrier frequency. The output signal from the oscillator O is furnished by a conductor 44 to a conventional four-phase generator 46. The four-phase generator 46 provides, as is known four output signals in phase quadrature. An output conductor 46*a* provides a signal, which may be a square wave or a sine wave, at a first predetermined phase relationship. An output terminal 46*b* provides an output signal 90° out of phase, or in phase quadrature with the output signal on the conductor 46*a*. An output conductor 46*c* provides an output signal in phase quadrature with the signal present on the conductor 46*b*, and 180° out of phase with the signal on the conductor 46*a*. An output conductor 46*d* provides an output signal in phase quadrature with the output signals present on the conductors 46*a* and 46*c* and 180° out of phase with the signal present on the conductor 46*b*.

The modulator M receives the carrier signal output on the conductors 46*a*, 46*b*, 46*c* and 46*d* from the four-phase generator 46 and modulates the phase increment signal from the encoder E onto the carrier signal to form the transmitted signal. A modulating gate circuit 50 of the modulator M performs the modulating function. A first modulating gate 51 is electrically connected with the conductors **40*b* and 42*b* and with the conductor 46*a* to form a 0° phase output signal representing the sum of the phase, or differential phase shift, and the previously transmitted signal. The encoder E indicates that the 0° phase output signal is required, based on incoming data, by presence at the outputs 28*c* and 28*d* of the flip-flops 28 and 18 of logic "0," and logic "1" at the output terminals 28*d* and 18*b*, respectively. Outputs of flip-flop 28 and 18 from the encoder E in response to waveforms 102 and 103 are shown at 105 and 106**, respectively.

A second modulating gate 52 is electrically connected with the conductors **40*b*, 42*a* and 46*b* to form a 90° phase output signal representing the sum of the phase increment signal and the previously transmitted signal. The encoder E indicates that a 90° phase output signal is required, based on the incoming data, when bit 1 of the phase increment signal is one, as indicated by a logic "1" at the output terminal 18*a* of the flip-flop 18, and when bit 2 of the phase increment signal is O, as indicated by a logic "1" at the output terminal 28*d* of the flip-flop 28**.

A third modulating gate 53 is electrically connected with the conductors **40*a*, 42*b* and 46*c* to form a 180° phase output signal representing the sum of the phase increment signal and the phase increment. The encoder E indicates same, based on the incoming data, when the bits 1 and 2 of the phase increment signal are 0 and 1, respectively, as indicated by a logic "1" at the output terminal 28*c* of the flip-flop 28, and a logic "1" at the output terminal 18*b* of the flip-flop 18**.

A fourth modulating gate 54 is electrically connected with the conductors **40*a*, 42*a* and 46*d* to form a 270° phase output signal indicating the sum of the phase increment signal and the previous signal. The encoder E indicates that a 270° output signal is needed, based on the incoming data, when the bits 1 and 2 of the phase increment signal are each 1, as indicated by logic "1" signals at the terminals 28*c* and 18*a* out of the flip-flops 28 and 18**, respectively.

An OR gate 55 is electrically connected to each of the modulating gates 51, 52, 53 and 54 and permits the output phase signal formed by each of the gates to pass therethrough.

The following chart defines the coding logic of the encoder E and the phase increment added by the encoder E onto the signal sent during the preceding transmission interval so that the incoming data bits on Channels 1 and 2 are indicated by the differential phase shift, (DPSK), or increment, between the present phase output signal and the phase output signal sent during the preceding transmission interval.

CODING LOGIC OF TRANSMITTER T

| Previous Signal | Incoming Data Ch. | Ch.2 | Phase Increment | Phase Output |
|---|---|---|---|---|
| 0° | 0 | 0 | 0° | 0° |
| | 0 | 1 | 90° | 90° |
| | 1 | 0 | 180° | 180° |
| | 1 | 1 | 270° | 270° |
| 90° | 0 | 0 | 0° | 90° |
| | 0 | 1 | 90° | 180° |
| | 1 | 0 | 180° | 270° |
| | 1 | 1 | 270° | 0° |
| 180° | 0 | 0 | 0° | 180° |
| | 0 | 1 | 90° | 270° |
| | 1 | 0 | 180° | 0° |
| | 1 | 1 | 270° | 90° |
| 270° | 0 | 0 | 0° | 270° |
| | 0 | 1 | 90° | 0° |
| | 1 | 0 | 180° | 90° |
| | 1 | 1 | 270° | 180° |

It should be noted that only four phase output signals are required, and that accordingly the carry output from adder 14 is not used.

It should be understood that the modulating gate circuit 50 is used when the output signals from the four-phase generator 46 are square waves. When the output signals of the four-phase generator 46 are sine waves, the modulating gates 51 through 54 are replaced by analog switches, and the OR gate 55 is replaced by a summing amplifier or summing junction.

An output conductor 57 provides the DPSK output signal from the modulator M to a band pass filter 58. The band pass filter 58 is set at the center frequency $f_o$ of transmission of the transmitter T, and a sinusoidal output signal is provided thereby over an output conductor 59.

The receiver R (FIG. 2) receives the incoming DPSK signal from the transmitter T over an input conductor **59*a*. The receiver R includes a quadriphase demodulator D and a subtracting decoder S. The quadriphase demodulator D includes a signal processing circuit 60 which derives a local reference signal from the received signal and a demodulating phase detector circuit 70 which demodulates the received signal with the local reference signal from the signal processing circuit 60** to form a received phase increment signal having one of four states. The decoder S responds to the received phase increment signal and forms output data bits in accordance with the state of the received phase increment signal.

The signal processing circuit 60 is a times-four loop deriving a local reference signal from the received signal to be furnished to the demodulating phase detectors 70. A signal squaring circuit or frequency doubling circuit 61 receives the input signal from the conductor **59*a*. The squaring circuit 61 forms an output signal having twice the frequency of the received input signal. The square wave output signal from the squaring circuit 61 is provided over a conductor 61*a* to a band pass filter 62. The band pass filter has a frequency pass band centered at twice the frequency of the carrier source oscillator O and the band pass filter 58 in the transmitter T (FIG. 1**).

A second squaring circuit 63 is electrically connected by a conductor **62*a* to the output of the band pass filter 62. The squaring circuit 63 operates in a like manner to the squaring circuit 61 to provide an output signal having twice the input signal frequency over an output conductor 63*a* to a band pass filter 64. The center frequency of the band pass filter 64 is four times the frequency of the incoming signal present at the input conductor 59*a*** to the receiver R.

A phase locked loop 65 operating at the center frequency of the band pass filter 64 receives the output of the filter 64 over an output conductor **64*a*. The phase locked loop 65 derives a phase-invariant signal at four times the carrier frequency of the incoming data signal and provides this signal over an output conductor 65*a* to a frequency divider network 66. The frequency divider network 66 divides the frequency of the incoming signal on the conductor 65*a* by a factor of four and accordingly provides an output signal over a conductor 66*a* at the carrier frequency, or frequency of the incoming data on the conductor 59*a***.

It should be noted that the signal processing circuit 60 in deriving a local reference signal forms a phase invariant signal. Because of the invariance of the locally derived reference signal, the incoming DPSK signal can assume any one of four phases relative to the phase invariant local reference signal formed in the signal processing circuit 60.

Figure 5:
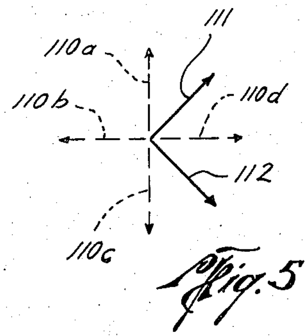
FIG. 5 is a voltage phasor diagram of signals present in the receiver of FIG. 2.

The four phases of the incoming DPSK are illustrated schematically in the accompanying drawings (FIG. 5) as voltage phasors 110*a*, 110*b*, 110*c* and 110*d*. The phase lock loop 65 forms a local reference signal which is synchronized with one of the four voltage phasors 110*a*, 110*b*, 110*c* and 110*d*. Since no reference signal is transmitted, however, the particular phasor synchronized with the phase invariant local reference signal is not known. Accordingly, the absolute phase of the incoming data on the conductor 59*a* is not determinable.

The transmitter T, as has been set forth, sends the DPSK output signal by adding a phase increment signal to the signal from the preceding transmission interval. Since the input data bits for the current transmission interval are thus represented by the phase increment added by the encoder E of the transmitter T, with the present invention the absolute phase of the incoming data is not required. As will be set forth below, the phase detecting demodulator circuit 70 forms a received phase increment signal having one of four states by comparing the phase invariant local reference signal with the incoming data.

The phase invariant signal from the signal processing circuit 60 is provided by the conductor 66*a* to a first phase shift network 71 of the phase detecting demodulator 70. The phase shift network 71 introduces a 45° phase shift to the phase invariant signal and provides such signal over an output conductor 71*a* to the remainder of the phase detector circuit 70. The 45° phase shift introduced to the phase invariant signal by the phase shift network 71 causes the output signal on the conductor 71*a* to assume a reference phase equidistant in phase between two of the four possible received phases. A voltage phasor 111 (FIG. 5) illustrates the reference phase of the signal on the conductor 71*a* equidistant between the phasors 110*a* and 110*d*, for example. It should be understood that the output signal on the conductor 71*a* may be formed equidistant between the phasors 110*a* and 110*b*, the phasors 110*b* and 110*c* or the phasors 110*c* and 110*d* depending upon the ambiguity between the incoming data and the local reference signal, as has been set forth.

The conductor 71*a* provides the phase shifted local reference signal to a second phase shift network 72 and to a first demodulating phase detector 73. The phase shift network 72 introduces a 90° phase shift to the signal present on the conductor 71*a* and furnishes such 90° phase shift signal over an output conductor 72*a* to a second demodulating phase detector 74. A voltage phasor 112 illustrates the phase relation between the signal on the conductor 72*a* and the signal on the conductor 71*a* as indicated by the phasor 111. The voltage on the conductor 72*a* is in phase quadrature with and lagging by 90° the signal on the conductor 71*a*.

The incoming DPSK signal on the input conductor 59*a* is furnished by input conductor 73*a* and 74*a* to the demodulating phase detectors 73 and 74. The phase detectors 73 and 74 are conventional circuits and provide output signals over output conductors 75 and 76 whose polarity depends upon the phase relation between the incoming DPSK signals and the phase shifted local reference signals on the conductor 71*a* and 72*a*.

The phase detector 73 provides a positive output signal over the output conductor 75 when the incoming DPSK signal and the phase shifted local reference signal on the conductor 71*a* are 90° or less different in phase. The output signal on the conductor 75 from the phase detector 73 is a negative signal when the incoming DPSK signal and the phase shifted local reference signal are more than 90° out of phase with each other.

Accordingly, when the incoming DPSK signal has a phase indicated by the phasors 110*a* and 110*d* (FIG. 5), the output of the phase detector 73 on the conductor 75 is positive. Conversely, when the incoming DPSK signal has a phase corresponding to the phasors 110*b* and 110*c*, the output conductor 75 has a negative output signal.

Similarly, the phase detector 74 provides a positive output signal on the conductor 76 when the incoming DPSK signal has a phase indicated by the phasors 110*c* and 110*d*, and a negative signal when the incoming DPSK signal has a phase corresponding to the phasors 110*a* and 110*b*.

Figure 4:
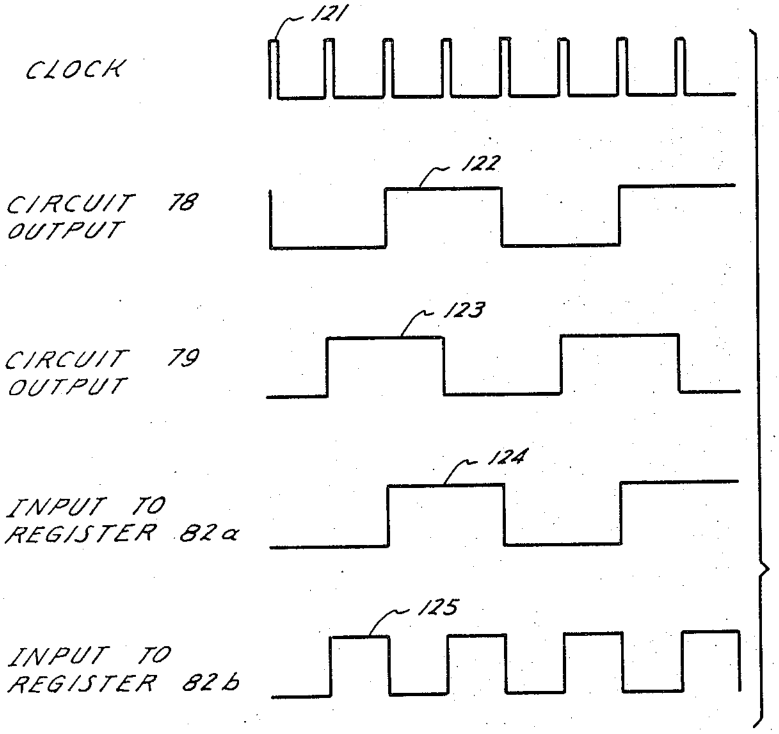
FIG. 4 is a voltage waveform diagram of signals present in the receiver of FIG. 2.

The output conductors 75 and 76 from the demodulating phase detector circuit 70 furnish the output signals from the phase detectors 73 and 74 to signal conditioner and bit synchronizer circuits 78 and 79, respectively. The signal conditioner and bit synchronizer circuits 78 and 79 are conventional and commercially available circuits which remove noise and produce two synchronized binary bit streams over output terminals 78*a* and 79*a*, respectively, to the subtracting decoder S an EMR Model 2726–02 PCM signal conditioner and Model 2727 Selector Module is one commercial model which could be used for the circuits 78 and 79. A common conductor 78*b* is electrically connected between the bit synchronizer portion of the circuit 78 and the bit synchronizer portion of the circuit 79 to insure that the circuits 78 and 79 operate in synchronism in response to a common clock pulse waveform 121 (FIG. 4). An output conductor 78*c* provides the clock pulse waveform 121 to the subtracting encoder S in order that the encoder S operates in synchronism with the remaining circuitry of the receiver R.

The signal conditioner and bit synchronizer circuits 78 and 79 respond to the presence of a positive output signal from the phase detector circuit 70 on the conductor 75 and 76 by providing a logic "0" output signal. Conversely, the circuits 78 and 79 respond to a negative input signal by providing a logic "1" output signal over the conductors 78*a* and 79*a* to the decoder S.

A count correcting Exclusive Or gate 81 is electrically connected at an input terminal 81*a* to the conductor 78*a* to receive the first bit of the output signal from the signal conditioner and bit synchronizer circuit 78. The Exclusive Or gate 81 is electrically connected at a second terminal 81*b* to the conductor 79*a* in order to receive the second bit of the received phase increment signal from the signal conditioner circuit 79. The Exclusive Or gate 81 is included in the decoder S in order to correct the input signal to the decoder S so that such input signal corresponds to the signal sent by the transmitter T.

For example, if the incoming signal to the receiver R is 45° out of phase with the local reference signals, as indicated by the phasors 110*d*, 111 and 112 (FIG. 5), an incoming signal increment of 180°, as indicated by the phasor 110*b*, causes a negative output signal from each of the detectors 73 and 74. The signal conditioner units accordingly indicate logic "1" at the output conductor 78*a* and 79*a*, respectively. The count correcting Exclusive Or gate corrects the erroneous indication of 270° by providing an output logic "0" at an output terminal 81*c*.

Sample outputs of the signal conditioner circuits 78 and 79 for a succession of received data bits are indicated by waveforms 122 and 123, while waveforms 124 and 125 indicate the effect of the count correcting Exclusive Or gate on waveforms 122 and 123, respectively.

A storage circuit 82 including a first one-bit shift register 82*a* electrically connected to the connector 78*a* and a second one-bit shift register 82*b*, electrically connected to the output 81*c* of the Exclusive Or gate 81 store the phase increment signal formed during the preceding transmission interval. The shift registers 82*a* and 82*b* are electrically connected by the conductor 78*c* to receive the clock pulse and operate in synchronism with the bit synchronizer portion of the signal conditioner circuits 78 and 79.

An inverter 83*a* electrically connects the shift register 82*a* to a first input 85*a* of a three-input adder 85. An inverter 83*b* is electrically connected between the shift register 82*b* and a first input terminal 87*b* of a second three-input adder 87. The inverters 83*a* and 83*b* invert the output logic signals from the shift registers 82*a* and 82*b* and thus adjust logic levels so that a positive output of either of the detectors 73 and 74 is indicated as a logic "1" at the inputs to the adders 85 and 87.

The adders 85 and 87 are like structure to the adder 14 in the transmitter T. The adder 85 is electrically connected at an input terminal 85*b* by a conductor 86 to the output of the signal conditioner circuit 78. The adder 85 thus serves as a comparator for forming a first bit of the output data signal by comparing the first bit of the currently received phase increment signal with the first bit of the phase increment signal stored in the shift register 82*a*.

In a like manner, the adder 87 is electrically connected by a conductor 86*a* to receive the output of the Exclusive Or gate 81 at an input terminal 87*b* thereof. The adder 87 forms a second bit of the output data signal by comparing the second bit of the currently received phase increment signal with the stored second bit of the received phase increment signal from the preceding transmission interval.

Since, as has been set forth above, the encoder E in the transmitter T forms the phase increment signal by adding a differential phase shift in accordance with the input data, the adders 85 and 87 are used as digital subtractors to digitally subtract the stored phase increment signal received during the preceding transmission interval from the phase increment signal currently being received. Accordingly, the adder 87 receives a logic "1" input signal at a third input 87*c* thereof. The adder 87 accordingly digitally subtracts the stored second bit of the phase increment signal from the preceding transmission interval, as provided at the input terminal 87*a* thereof, from the currently received second bit of the phase increment signal, provided at the input terminal 87*b*. The adder 87 provides an output signal indicating the result of the digital subtraction over an output terminal 87*d* to an output conductor 90*a*. The adder 87 further provides a Carry subtract signal at an output terminal 87*e* when the subtraction result must be carried from the second bit to the first bit.

A conductor 88*a* electrically connects the Carry output terminal 87*e* to a third input 85*c* of the adder 85. The adder 85 digitally subtracts the stored first bit of the phase increment signal present at the input terminal 85*a* from the currently received first bit of the phase increment signal as present at the input terminal 85*b*, together with subtracting the carry subtract signal present at the input terminal 85*c*, when appropriate. The adder 85 provides the first bit of the output data signal at an output terminal 85*d* to a conductor 90*b*. A Carry output terminal 85*e* of the adder 85 provides a Carry Output signal in a like manner to the adder 87. However, the Carry signal formed by the adder 85 is not necessary for the operation of the present invention.

In the operation of the present invention, the incoming data bits of Channel 1 and Channel 2 on the conductors 11 and 12 are encoded in the encoder E so that a phase increment signal having one of four values in accordance with the state of the input data bits is formed. The encoder E forms a two-bit phase increment signal for each successive transmission interval in response to the incoming data bits by comparing the two incoming data bits with the two bits of the phase increment signal formed during the preceding transmission interval. The phase increment signal from the encoder E is modulated onto the output signal from the carrier oscillator O in the modulator M to form the phase output signal transmitted through the filter 58 over the output conductor 59.

The output signal from the transmitter T is sensed at the input conductor 59*a* of the receiver R and a local reference signal is derived from the incoming signal by the quadriphase demodulator D. The local reference signal is then used by the demodulating phase detectors 73 and 74 to demodulate the received signal and form a reference phase increment signal having one of four states. As has been set forth above, the ambiguity due to the lack of a carrier reference signal is overcome by the phase detectors 73 and 74, in conjunction with the subtracting decoder S. The subtracting decoder S responds to the received phase increment signal from the phase detectors 73 and 74 and forms output data bits in accordance with the state of the received phase increment signal.

The subtracting decoder S forms the output data bits by comparing the received two-bit phase increment signal with the phase increment signal formed during the preceding transmission interval. In this manner, two data bits are transmitted as a four-phase DPSK transmission signal from the transmitter T to the receiver R without requiring a phase reference signal to be transmitted therewith, and without requiring multiple frequency channels and additional bandwidth.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

We claim:

1. A quadriphase differential phase-shift-keyed communication system, said system including:

a. transmitter means for transmission of a phase-shift-keyed signal formed from input data bits wherein the input data bits are furnished to said transmitter means over two channels as two streams of incoming data bits for each successive transmission interval, said transmitter means comprising 1. carrier source means for providing a carrier signal of a predetermined frequency;
2. encoding means responsive to the input data bits for forming a two bit phase increment signal having one of four values in accordance with the input data bits;
3. means for modulating the phase increment signal onto the carrier signal to form the transmitted signal representing the data bits by the phase increment signal; said encoding means comprising first comparator means for forming the first bit of the phase increment signal by comparing a first incoming data bit with the first bit of the phase increment signal formed during the preceding transmission interval, and second comparator means for forming the second bit of the phase increment signal by comparing a second incoming data bit with the second bit of the phase increment signal formed during the preceding transmission interval; and b. receiver means for receiving the signal from said transmitter means, said receiver means comprising 1. means for deriving a local reference signal from the received signal;
2. demodulator means for demodulating the received signal with the local reference signal to form a received phase increment signal having one of four states; and
3. decoding means responsive to the received phase increment signal for forming output data bits in accordance with the state of the received phase increment signal.

2. The structure of claim 1, wherein said first comparator means comprises:

a. means for storing the first bit of the phase increment signal formed during the preceding transmission first adder interval; and b. first adder means for forming the first bit of the phase increment signal when the stored first bit and the incoming data bit differ.

3. The structure of claim 2, wherein said first adder means comprises:

means for forming a carry output signal when the stored first bit and the incoming data bit are logic "1" levels.

4. The structure of claim 3, wherein said second comparator means comprises:

a. means for storing the second bit of the phase increment signal formed during the preceding transmission interval;

b. second adder means for digitally adding the stored second bit, the second incoming data bit and the carry output signal to form the second bit of the phase increment signal.

5. The system of claim 1 wherein said decoding means comprises means for forming a two bit output data signal, said decoding means further comprising:

a. first receiver comparator means for forming the first bit of the output data signal by comparing the first bit of the currently received phase increment signals with the first bit of the received phase increment signal from the preceding transmission interval; and b. second receiver comparator means for forming the second bit of the output data signal by comparing the second bit of the currently received phase increment signal with the second bit of the received phase increment signal from the preceding transmission interval.

6. The structure of claim 5, wherein said first receiver comparator means comprises:

a. means for storing the first bit of the received phase increment signal from the preceding transmission interval; and b. first subtractor means for forming the first bit of the output data signal when the stored first bit of the received phase increment signal and the first bit of the currently received phase increment signal differ.

7. The structure of claim 6, wherein said second receiver comparator means comprises a. storage means for storing the second bit of the received phase increment signal from the preceding transmission interval; and b. second subtractor means for digitally subtracting said stored second bit in said storage means from the currently received second bit of the phase increment signal, said second subtractor means including a three-input adder means for receiving the stored second bit in said storage means at one input, the currently received second bit of the phase increment signal at a second input, and a constant logic "1" signal at a third input thereof, and said adder means forming a carry output subtract signal when at least two of the signals to the said adder inputs are logic "1" signals.

* * * * *